United States Patent
Lamprecht et al.

(10) Patent No.: US 8,550,430 B2
(45) Date of Patent: Oct. 8, 2013

(54) VALVE FOR THE SUBSTANTIALLY GAS-TIGHT INTERRUPTION OF A FLOW PATH

(75) Inventors: Michael Lamprecht, Mader (AT); Wolfgang Weiss, Hard (AT)

(73) Assignee: Vat Holding AG, Haag (CH)

( * ) Notice: Subject to any disclaimer, the term of this patent is extended or adjusted under 35 U.S.C. 154(b) by 0 days.

(21) Appl. No.: 13/560,560

(22) Filed: Jul. 27, 2012

(65) Prior Publication Data

US 2013/0025704 A1 Jan. 31, 2013

(30) Foreign Application Priority Data

Jul. 28, 2011 (EP) ..................................... 11175698

(51) Int. Cl.
*F16K 25/00* (2006.01)
(52) U.S. Cl.
USPC ............ 251/175; 251/158; 251/193; 251/301
(58) Field of Classification Search
USPC ................. 251/158–159, 170, 172, 175, 187, 251/193, 195, 197, 200, 301–302, 326, 328–329, 251/333; 137/630.12–630.15
See application file for complete search history.

(56) References Cited

U.S. PATENT DOCUMENTS

| | | | | |
|---|---|---|---|---|
| 1,723,264 | A * | 8/1929 | Wilson | ........................... 251/177 |
| 3,145,969 | A | 8/1964 | von Zweck | |
| 3,241,807 | A * | 3/1966 | Holderer | ........................ 251/158 |
| 4,470,576 | A * | 9/1984 | Schertler | ........................ 251/158 |
| 5,577,707 | A | 11/1996 | Brida | |
| 6,056,266 | A | 5/2000 | Blecha | |
| 6,089,537 | A | 7/2000 | Olmsted | |
| 6,416,037 | B1 | 7/2002 | Geiser | |
| 6,561,483 | B2 | 5/2003 | Nakagawa | |
| 6,561,484 | B2 | 5/2003 | Nakagawa et al. | |
| 6,629,682 | B2 | 10/2003 | Duelli | |
| 7,086,638 | B2 * | 8/2006 | Kurita et al. | ................... 251/199 |
| 7,828,267 | B2 * | 11/2010 | Iwabuchi | ....................... 251/175 |
| 2005/0067603 | A1 | 3/2005 | Lucas et al. | |
| 2007/0138424 | A1 | 6/2007 | Geiser | |
| 2007/0138425 | A1 | 6/2007 | Geiser | |
| 2007/0138426 | A1 | 6/2007 | Geiser | |
| 2012/0161055 | A1 * | 6/2012 | Nakamura et al. | ............. 251/329 |

FOREIGN PATENT DOCUMENTS

| | | |
|---|---|---|
| DE | 1264191 | 3/1968 |
| DE | 7731993 | 1/1978 |
| DE | 3447008 | 7/1985 |
| EP | 2287501 | 2/2011 |

* cited by examiner

*Primary Examiner* — John K Fristoe, Jr.
*Assistant Examiner* — Marina Tietjen
(74) *Attorney, Agent, or Firm* — Muncy, Geissler, Olds & Lowe, PLLC; Mark E. Olds

(57) ABSTRACT

A valve for the gastight interruption of a flow path is disclosed. A valve housing includes a first opening and a valve seat. A valve disk includes an inner disk portion, which is linearly movable relative to an outer disk portion so that, in a closed setting, a pressure differential acts substantially upon the movable inner disk portion, which is supported on the valve housing. The valve seat has a radially inward pointing first inner face and the outer disk portion has a radially outward pointing first outer face, wherein in the closed setting there exists a radial sealing contact with the first inner face. The outer disk portion has a radially inward pointing second inner face and the inner disk portion has a radially outward pointing second outer face, having a radially sealing contact with the second inner face.

14 Claims, 5 Drawing Sheets

VALVE FOR THE SUBSTANTIALLY GAS-TIGHT INTERRUPTION OF A FLOW PATH

The present application claims priority to European Patent Application No.: 11175689.7, which was filed in the EPO on Jul. 28, 2011, and which is herein incorporated by reference in its entirety.

BACKGROUND OF THE INVENTION

1. Field of the Invention

The invention relates to a valve for the substantially gastight interruption of a flow path, according to the preamble to claim 1. Such valves, particularly in the form of shuttle valves or slide valves, are used, above all, in vacuum technology.

2. Description of the Background Art

A valve according to the preamble to claim 1 is known from US 2007/0138424 (Geiser), which is regarded as the closest prior art.

Valves of the type stated in the introduction are known in different embodiments from the prior art and are used, in particular, in vacuum chamber systems in the field of IC, semiconductor or substrate production, which must take place in a protected atmosphere as far as possible without the presence of contaminating particles. Such vacuum chamber systems comprise, in particular, at least one evacuatable vacuum chamber, designed to receive semiconductor elements or substrates which are to be machined or produced, which vacuum chamber possesses at least one vacuum chamber opening, through which the semiconductor elements or other substrates can be led into and out of the vacuum chamber, and further comprise at least one vacuum pump for evacuating the vacuum chamber. For instance, in a production plant for semiconductor wafers or liquid-crystal substrates, the highly sensitive semiconductor or liquid-crystal elements pass sequentially through a plurality of process vacuum chambers, in which the parts located within the process vacuum chambers are machined by means of a respective machining device. Both during the machining process within the process vacuum chambers and during the transport from chamber to chamber, the highly sensitive semiconductor elements or substrates must always be in a protected atmosphere—in particular in an airless environment.

To this end, on the one hand peripheral valves for opening and closing a gas intake or gas discharge and, on the other hand, transfer valves for opening and closing the transfer openings of the vacuum chambers for the introduction and removal of the parts are used.

The vacuum valves which are passed through by semiconductor parts, due to the described field of application and the therewith associated dimensioning, are referred to as vacuum transfer valves, due to their rectangular apertural cross section, also as right-angle valves and, due to their normal working method, also as slide valves, right-angle slide valves or transfer slide valves.

Peripheral valves are used, in particular, to control or regulate the gas flow between a vacuum chamber and a vacuum pump or a further vacuum chamber. Peripheral valves are found, for instance, within a pipe system between a process vacuum chamber or a transfer chamber and a vacuum pump, the atmosphere or a further process vacuum chamber. The apertural cross section of such valves, also termed pump valves, is generally smaller than in a vacuum transfer valve. Since peripheral valves, depending on the field of application, are used not only to fully open and close an opening, but also to control or regulate a flow rate by continuous adjustment of the apertural cross section between a fully open setting and a gastight closed setting, they are also referred to as regulating valves. A possible peripheral valve for controlling or regulating the gas flow is the shuttle valve.

In a typical shuttle valve, as known, for instance, from U.S. Pat. No. 6,089,537 (Olmsted), in a first step a generally round valve disk is rotationally pivoted, via a generally likewise round opening, from a setting which frees the opening into an intermediate setting which covers the opening. In the case of a slide valve, as described, for instance, in U.S. Pat. No. 6,416,037 (Geiser) or U.S. Pat. No. 6,056,266 (Blecha), the valve disk, as, too, the opening, is normally of rectangular configuration and, in this first step, is slid linearly from a setting which frees the opening into an intermediate setting which covers the opening. In this intermediate setting, the valve disk of the shuttle or slide valve is in a remote opposition to the valve seat surrounding the opening. In a second step, the distance between the valve disk and the valve seat is reduced, so that the valve disk and the valve seat are pushed uniformly closer together and the opening is closed off in a substantially gastight manner. This second motion is preferably made substantially in a perpendicular direction to the valve seat. The sealing can be realized, for example, either via a seal ring which is disposed on the close-off side of the valve disk and is pressed onto the valve seat running around the opening, or via a seal ring on the valve seat, against which the close-off side of the valve disk is pushed. As a result of the two-step closing operation, the sealing ring between the valve disk and the valve seat is barely subjected to shearing forces which would destroy the sealing ring, since the motion of the valve disk in the second step takes place substantially in a straight line perpendicularly to the valve seat.

From the prior art, different drive systems for obtaining this combination of a, in the case of the shuttle valve, rotatory and, in the case of the slide valve, translatory motion of the valve disk parallelly over the opening, and a substantially translatory motion perpendicularly to the opening are known, for instance from U.S. Pat. No. 6,089,537 (Olmsted) for a shuttle valve and from U.S. Pat. No. 6,416,037 (Geiser) for a slide valve.

The pressing of the valve disk onto the valve seat must be realized such that both the required gas-tightness is ensured within the whole of the pressure range, and damage to the sealing medium, in particular of the sealing ring in the form of an O-ring, as a result of excessive pressure load is avoided. In order to ensure this, known valves provide a contact pressure regulation of the valve disk which is governed by the pressure difference prevailing between the two valve disk sides. Particularly in the case of large pressure fluctuations or the change from underpressure to overpressure, or vice versa, a uniform force distribution along the whole of the periphery of the sealing ring cannot, however, always be ensured. In general terms, it is endeavored to decouple the sealing ring from supporting forces deriving from the pressure present at the valve. In U.S. Pat. No. 6,629,682 (Duelli), a vacuum valve having a sealing medium is proposed to this end, which vacuum valve is composed of a sealing ring and an adjacent supporting ring, so that the sealing ring is substantially rid of supporting forces.

In order to achieve the required gas-tightness, where necessary both for overpressure and underpressure, additionally or alternatively to the second motional step, some known shuttle valves or slide valves provide a valve ring which is displaceable perpendicular to the valve disk and surrounds the opening and which, for the gastight closure of the valve, is pushed onto the valve disk. Such valves having valve rings which are actively displaceable relative to the valve disk are known, for instance, from DE 1 264 191 B1, DE 34 47 008 C2, U.S. Pat. No. 3,145,969 (von Zweck) and DE 77 31 993 U. In U.S. Pat. No. 5,577,707 (Brida) a shuttle valve comprising a valve housing, which has an opening, and comprising a valve disk, which can be pivoted parallelly over the opening, for controlling a flow rate through the opening, is described. A valve ring, which encloses the opening, is actively movable vertically in the direction of the valve disk by means of a plurality of springs and compressed air cylinders. A possible refinement of this shuttle valve is proposed in US 2005/0067603 A1 (Lucas et al.).

U.S. Pat. No. 6,561,483 (Nakagawa) and U.S. Pat. No. 6,561,484 (Nakagawa et al.) disclose vacuum valves in different embodiments which comprise a divided valve disk. A first disk portion, which bears an axial seal, possesses an opening. A second disk portion is connected to the first disk portion by means of an expandable body. An actuator is disposed between the first and the second disk portion, so that the two disk portions can actively be moved closer together and farther apart. The expandable body is configured as a bellows. The first disk portion can be pressed by means of the actuator against the valve seat, so that an axially sealing contact is obtained, wherein the second disk portion—particularly in the case of an overpressure present on the valve seat side—is supported, where necessary, on an opposite valve housing side. The structure of the described vacuum valves, especially due to the large number of component parts and the need to use a bellows to seal off the first disk portion from the second disk portion, as well as, in some cases, a separate drive within the bellows, is relatively complex. Moreover, the described valves are awkward to maintain and prone to dirt contamination. Furthermore, the axial seal is not fully rid of differential pressure forces present at the valve, so that the axial contact pressing force is subject to certain fluctuations, whereby the wear on the axial seal is increased or leaks can be formed, particularly if the contact pressure of the axial seal is too low.

A further disadvantage of such valves having an actively adjustable valve ring is the relatively complicated and installation space-intensive structure of the valve, the need for complex control of the contact pressing forces and the presence of a plurality of moving parts in the flow channel, which make maintenance and cleaning of the valve more difficult.

Especially due to the field of application of shuttle and slide valves between process chambers and vacuum pumps in long production plants, a flattest possible structure of the valve in relation to the distance from opening to opening is required, for instance in order to keep the transport paths of the parts or gases short and the inner gas total volume low, and to arrange the individual components of the production plant as close together as possible and thus allow a compact construction of the production plants. This requirement for numerous applications is only inadequately met by valves, in particular, which have an actively adjustable valve ring or valve disk portions.

From US 2007/0138424 (Geiser) and US 2007/0138425 (Geiser), a valve, in particular a shuttle or slide valve, for the substantially gastight interruption of a flow path is known. The valve comprises a valve housing having a first wall, which wall has a first opening and a first valve seat, a valve disk having a close-off side comprising a sealing ring, and at least one drive. By means of the drive, the valve disk is pivotable or displaceable from an open position substantially parallel to the first valve seat and the vertical distance between the valve disk and the first valve seat is reducible such that, by virtue of an axially sealing contact between the sealing ring and the first valve seat, the flow path in the closed position is interrupted in a substantially gastight manner. The valve disk comprises an outer disk portion, on the rear side of which is disposed a star-shaped strut arrangement, which connects the outer disk portion to an arm, connected to a drive, in a central region situated close to the center axis of the first opening. The valve disk fixes the sealing ring perpendicular to the first valve seat. The valve disk further possesses an inner disk portion having an outer peripheral surface. The inner disk portion is mounted movably relative to the outer disk portion in a direction substantially perpendicular to the first valve seat. The outer peripheral surface is enclosed by the sealing ring such that a substantially gastight internal seal is formed. The sealing ring thus fulfills two sealing functions. On the one hand, it seals in the radial direction the joint between the inner and the outer disk portion, on the other hand, in the closed position of the valve, it seals in the axial direction the outer disk portion with respect to the valve seat. In the closed position, a pressure differential at the valve disk hence acts substantially upon the inner disk portion, so that the inner disk portion is supported, vertically decoupled from the outer disk portion, on a portion of the valve housing, in particular the first valve seat or a lateral groove. One advantage of this valve consists in the use of just a single seal, which has a dual function as an axial and radial seal. A disadvantage consists in the relatively complex structure of the valve and the need for a specific axial contact pressing force of the seal upon the valve seat to ensure the axial seal, for which reason the outer disk portion, by means of the rear strut arrangement connected centrally to the arm in order to avoid tilting, must be built relatively robust.

SUMMARY OF THE INVENTION

The object of the invention is therefore to solve the above-described problems and to provide a valve of the type stated in the introduction which is built as simply and compactly as possible and is also capable of withstanding bilaterally acting, high pressure loads, and which is distinguished by low seal wear, even in the face of high differential pressures and pressure fluctuations.

This object is achieved by the realization of the characterizing features of the independent patent claims. Features which refine the invention in an alternative or advantageous manner can be gleaned from the dependent patent claims.

The invention is based on providing an at least two-part valve disk having an outer disk portion and an inner disk portion and on designing both disk portions such that they form a radial seal. The outer disk portion can be brought into contact with the valve seat of the valve housing via a radially acting main seal. Although such a radial seal offers substantially no axial support, so that another element must attend to the axial support, axial forces do not therefore act upon the seal, whereby the seal is protected. An inner disk portion disposed within the outer disk portion is mounted such that it is axially movable relative to the outer disk portion in a sealing—in particular gas-sealing—manner, wherein a radially acting supplementary seal is provided between the disk portions. In the closed setting of the valve, a pressure differential at the valve disk acts substantially upon the movable inner disk portion, and the inner disk portion is supported, substantially decoupled from the outer disk portion, directly or indirectly on the valve housing. Through the use of two radial seals, which seal radially in a direction perpendicular to the acting differential pressure force, both radial seals remain unstressed by the prevailing differential pressure, whereby the working life of the seals is increased. Moreover, neither the prevailing differential pressure, nor a contact pressing force, acts upon the drive of the valve disk, so that neither the drive, nor the connection between the drive and the outer disk portion, is exposed to high forces. This enables a compact and simple structure of the valve with relatively few component parts.

The valve according to the invention for the substantially gastight interruption of a flow path comprises a valve housing having a first wall, which wall has a first opening for the flow path. The first opening has a geometric opening axis and a valve seat which encloses the first opening. In other words, the valve seat surrounds the first opening. The first opening and the valve seat are located on a first side of the valve housing. For instance, the first side is that side on which a vacuum pump for evacuating a vacuum chamber is connected, while the second side of the valve housing leads to the vacuum chamber. Of course, other applications or arrangements are also possible. The first opening has, for instance, a circular or oval cross section or a rectangular cross section with rounded corners. The geometric opening axis is, in particular, the center axis of the first opening and is defined, for instance, by the longitudinal course of the opening, by the course of a connection disposed on the opening, by the connecting line to a possible second opening of the valve housing, or by the surface area of the valve seat. By a valve seat should be understood, in general, functional terms, a portion in the first wall which acts as a sealing surface and on which a further face acting as the sealing surface can come to rest. The valve housing can also be formed by the wall alone. The flow path is the regular, blockable flow path of a gaseous or liquid medium through the first opening, where necessary a second opening, and the valve.

Moreover, the valve comprises a valve disk by means of which the first opening can be closed off and reopened. The valve disk possesses, for instance, a round, oval or rectangular cross section. The dimensioning of the valve disk enables the first opening to be closed off by overlapping and mounting onto the first opening and its valve seat. The valve disk is of at least two-part configuration and is divided into two components, namely an outer disk portion and an inner disk portion, which are axially movable relative to one another within a motional range.

If, within the scope of the invention, radial and axial directions and sealing effects are mentioned, this refers in general to directions substantially perpendicular or transverse to the geometric opening axis or substantially parallel to the opening axis. All directions or straight lines which lie substantially on a plane to which the opening axis forms a geometric normal should be construed as radial directions or straight lines, even if they do not point directly at or away from the opening axis or intersect the opening axis, but run, for instance, askance thereto. By contrast, all directions or straight lines which run substantially parallel to the opening axis should be construed as axial directions or straight lines. The term "radial" thus refers not only to a circular cross section of the opening or of the valve disk, inclusive of the respective portions, but also to other, for instance rectangular cross sections. In the latter case, by radial should be understood, for instance, a direction from inside to out, and vice versa, perpendicular or transverse to the opening axis and, by axial, any direction substantially parallel to the opening axis. In the case of movable components, in particular the valve disk, the axial and radial directions relate to a closed state of the valve.

The outer disk portion is, in particular, of ring-like or frame-like configuration and encloses or surrounds the inner disk portion, which is of closed configuration. By a closed disk portion should be understood that the inner disk portion, where necessary jointly with other components, forms a closed surface, so that the inner disk portion forms jointly with the outer disk portion surrounding it a closure surface, by means of which the first opening can be completely covered and closed off.

The inner disk portion is mounted in a sealtight, in particular gastight manner, such that it is linearly movable within the outer disk portion in a direction parallel to the opening axis relative to the outer disk portion between a retracted setting and an extended setting. In other words, the inner disk portion can be moved freely relative to the outer disk portion between the retracted and the extended setting, wherein, in and between these settings, a gastight joint exists between the inner and outer disk portion. Again in other words, the inner disk portion, within a specific motional range in the direction of the opening axis, is decoupled from the outer disk portion. By the retracted setting should in general terms be understood a first setting of the inner disk portion relative to the outer disk portion, while by the extended setting should be understood a second such relative setting. Preferably, the retracted setting is that setting in which the inner disk portion, in its axial extent, is largely enclosed all the way round by the outer disk portion, while in the extended setting the inner disk portion, in its axial extent, is only partially enclosed by the outer disk portion.

The outer disk portion has a second inner face, which points radially inward and runs parallel to the opening axis. The inner disk portion has a second outer face, which corresponds with the second inner face of the outer disk portion, points radially outward and runs parallel to the opening axis. This second outer face and this second inner face are arranged and configured such that, via an intervening second seal, a radially sealing contact exists between the second inner face of the outer disk portion and the second outer face of the inner disk portion. This radially sealing contact is ensured within the region between the retracted setting and the extended setting. If a region between two settings is generally mentioned, then these two settings are also generally jointly included.

The radially sealing second seal between the disk portions is configured, in particular, as an O-Ring or vulcanized-on seal. This second seal can be disposed either on the second inner face of the outer disk portion for the creation of the radially externally sealing contact with the second outer face of the inner disk portion, or it is located on the second outer face of the inner disk portion for the creation of the radially internally sealing contact with the second inner face of the outer disk portion. It is also possible, however, for this seal to exist on a purely functional basis and to be formed by a sealing guidance of the second outer face in the second inner face.

The second seal is configured and arranged such that the inner disk portion, when not acted upon by external forces, in particular without the influence of a differential pressure at the valve, depending on the assembly setting of the valve aside from the gravitational force, is held in its respective axial setting within the outer disk portion. In other words, the second seal is such that the inner disk portion does not shift without mechanical or pressure influence from outside.

Moreover, the valve comprises at least one drive, which is connected to the outer disk portion and by means of which this outer disk portion, and thus also indirectly the inner disk portion, can be adjusted both by a transverse motion and by a longitudinal motion. By a transverse motion should be understood, in general terms, a motion substantially perpendicular or transverse to the opening axis, i.e. substantially within a plane to which the opening axis forms a geometric normal, while the longitudinal motion is a motion substantially parallel to the opening axis.

On the one hand, the drive is configured such that the valve disk is pivotable or displaceable between an open setting and an intermediate setting by means of the transverse motion made substantially transversely to the opening axis. This motion can thus be a pivot motion, in particular on a circular path, a linear motion or some other motion substantially transverse to the opening axis. In the open setting, the valve disk is positioned in a retention portion disposed beside the first opening and frees the first opening and the flow path. This retention portion can be an appropriate portion within the valve housing, in particular a parking portion for the valve disk, or some other, more abstract portion. In the intermediate setting, the valve disk is positioned over the first opening and covers the apertural cross section of the first opening, wherein the valve disk is located in remote opposition to the valve seat. In other words, in the intermediate setting, in the direction of the opening axis, a distance exists between the valve disk and the valve seat. Thus although the first opening, in the intermediate setting, is covered by the valve disk, it is not closed off in a gastight manner.

On the other hand, the drive is configured such that the valve disk is displaceable between the intermediate setting and a closed setting by means of the longitudinal motion made parallel to the opening axis. In the closed setting, a tight contact, which closes the first opening in a sealtight, in particular gastight manner and interrupts the flow path, exists between the outer disk portion and the valve seat. In other words, the vertical distance between the valve disk and the valve seat is reduced in the closed setting such that a tight contact exists between the outer disk portion and the valve seat, and the first opening, due to the tight joint between the outer disk portion and the superficially closed inner disk portion, is closed off in a fully sealtight manner. In the closed setting, a pressure differential at the valve disk thus acts substantially upon the movable inner disk portion. Due to the unrestricted mobility of the inner disk portion, this is displaced in the event of a prevailing pressure differential. The valve and the valve disk are configured such that the inner disk portion is supported in a direction parallel to the opening axis, substantially decoupled from the outer disk portion, directly or indirectly on the valve housing. The differential pressure. force thus acts via the inner disk portion substantially upon the valve housing, and the outer disk portion and also the drive remain substantially unstressed by the differential pressure force.

The invention further provides that the valve seat has a first inner face, which points radially inward and runs parallel to the opening axis. The outer disk portion has a first outer face, which points radially outward and runs parallel to the opening axis. This first outer face and this first inner face are arranged and configured such that in the closed setting, via an intervening first seal, a radially sealing contact exists between the first inner face and the first outer face. As a result of this radially sealing contact between the outer disk portion and the valve seat, the gastight closure is realized merely by displacement of the outer disk portion, with its first outer face, into the region within the first inner face of the valve seat, so that the first inner face of the valve seat encloses the first outer face of the outer disk portion and the intervening first seal produces the gastight joint. The gastight contact thus continues to be ensured for as long as the first outer face of the outer disk portion is located within the first inner face of the valve seat with an intervening first seal, wherein a slight relative axial displacement does not impair the gastight joint between the outer disk portion and the valve seat. The first seal can also functionally be formed by a correspondingly sealtight guidance of the first outer face in the first inner face.

Since neither substantial differential pressure forces act upon the outer disk portion, nor a high contact pressure upon the valve seat has to be maintained, the drive and the mounting of the valve disk absorb no large forces and can be dimensioned accordingly. In particular, the outer disk portion can be connected to the at least one drive by an arm arranged in such a way on the side of the outer disk portion and extending in such a way perpendicular to the opening axis that the arm, in the closed setting, is located outside the apertural cross section, geometrically projected along the opening axis, of the first opening. In other words, an, in particular star-shaped strut arrangement, which is disposed on the rear of the valve disk and connects the outer disk portion to the drive in a central region lying close to the center axis of the first opening, as required by the prior art, can now be dispensed with, since no large forces need to be absorbed by the drive arm. The invention provides that the drive arm is merely disposed on the side of the outer disk portion.

Preferably, the first seal is fixed on the first outer face of the outer disk portion in order to produce the radially sealing contact with the first inner face of the valve seat. This has the advantage that the first seal, when the valve is fully open, is outside the flow region and is thus broadly protected from contaminations generated by the medium and flowing through the valve. Alternatively, it is also a possibility, however, that the first seal is fixed on the first inner face of the valve seat in order to create the radially sealing contact with the first outer face of the outer face of the outer disk portion. It is also possible for the first seal to be arranged on both portions. The first seal is formed, in particular, by an O-Ring, held, for instance, in a groove, or by a vulcanized-on seal.

In one refinement of the invention, the outer disk portion is of annular configuration, wherein the inner disk portion has the form of a closed circular disk, in particular having lateral flanks in the form of a cylindrical shell surface on which the second outer face is disposed. Preferably, in this or a general embodiment, the first inner face and the first outer face, and/or the second inner face and the second outer face, are geometric circular-cylindrical shell surfaces. Alternatively, the possibility exists that these are in the form of general cylindrical shell surfaces extending parallel to the opening axis, wherein the base line can also, instead of a circular shape, have an oval, polygonal or other shape. In particular, the valve is a shuttle valve, wherein the drive is preferably configured such that the valve disk is pivotable by means of the transverse motion substantially parallelly over the cross section of the first opening and perpendicularly to the opening axis. It is also possible, however, for the valve to be a slide valve or a transfer valve, for example of the L-type.

As is represented, in the closed setting a pressure differential at the valve disk acts substantially upon the movable inner disk portion, wherein the inner disk portion is supported in a direction parallel to the opening axis, substantially decoupled from the outer disk portion, directly or indirectly on the valve housing. In one refinement of the invention, the inner disk portion is supported indirectly via the outer disk portion in one direction on the valve housing. Preferably, to this end, a first bearing surface, which in particular encloses the first opening, is shaped out on the first wall. This first bearing surface and the outer disk portion are arranged and configured such that, in the closed setting of the valve disk, the outer disk portion rests on the first bearing surface. To this end, on the outer disk portion is provided a first face, which in the intermediate setting lies remotely opposite the first bearing surface and in the closed setting rests on the first bearing surface in the direction of the first side. The first bearing surface of the first wall and the first face of the outer disk portion have mutually corresponding shapes, in particular they respectively have a ring shape. In one refinement, the first bearing surface is configured as an offset in the first opening, which offset adjoins the first inner face of the valve seat and runs substantially perpendicular to the opening axis. This first bearing surface serves, on the one hand, as a travel limitation for the drive so as to bring the outer disk portion into a defined closed setting, while, on the other hand, it can additionally serve as an indirect supporting surface for the inner disk portion.

One refinement of the invention provides that a stop is provided between the outer disk portion and the inner disk portion in order to limit the relative linear mobility of the inner disk portion in the direction of the first side and of the first opening. This stop is arranged such that in the closed setting the inner disk portion, when relative underpressure prevails on the first side of the first opening, rests in the retracted setting on the outer disk portion. For instance, the stop is configured as a shoulder of the inner disk portion, which shoulder extends radially outward from the second outer face. Given relative underpressure on the first opening, it is thus possible for the inner disk portion to be supported by the stop on the outer disk portion and for the latter, in turn, to be supported by its first face on the first bearing surface. The drive, the drive arm and the two seals remain in this case substantially unstressed.

According to one inventive refinement, the valve housing has on a second side situated remotely opposite the first side a second wall. In this second wall, in remote, substantially parallel opposition to the first wall and to the first opening, a second opening for the flow path is shaped out. This second opening has a second opening axis, which preferably corresponds to the opening axis of the first opening. On the second wall is found a second bearing surface, which encloses, in particular, the second opening and lies opposite, in particular, the first bearing surface at a parallel distance apart. The second bearing surface and the inner disk portion, in order to limit the relative linear mobility of the inner disk portion in the direction of the second side and of the second opening, are arranged and configured such that in the closed setting the inner disk portion, when relative underpressure prevails on the second side of the second opening, rests in the extended setting with a second face in the direction of the second side on the second bearing surface. In other words, the distance apart and location of the second bearing surface on the second wall and of the second face on the inner disk portion are such that the inner disk portion is supported with its second face in the direction of the second side on the second bearing surface as soon as, in the closed setting of the valve disk, relative underpressure prevails on the second side of the second opening. This setting in which the inner disk portion is found when resting on the second bearing surface is the extended setting of the inner disk portion. In one possible embodiment of the invention, the second face of the inner disk portion is disposed on a shoulder extending radially outward from the second outer face. In particular, the shoulder in question is that shoulder which also serves as said stop of the inner disk portion.

A fundamental requirement of a vacuum valve used in a production process for semiconductors is the avoidance of friction particles. Depending on the field of application of the valve, it can be fundamentally important that no metal to metal contact occurs in the opening and closing of the valve. The inner disk portion, which in the extended setting rests on the second bearing surface, should therefore, prior to the transversely directed adjustment of the valve disk from the intermediate setting into the open setting, be brought back into the retracted setting, in order that a frictional contact of the inner disk portion on the second bearing surface of the second wall during the transverse adjustment of the valve disk between the intermediate setting and the open setting is avoided. This can be realized, for example, by the use of a spring, which acts between the inner and the outer disk portion and holds the inner disk portion in the unloaded state in the retracted setting. A spring arrangement of this type is known from the closest prior art. A drawback of such a spring arrangement consists in the fact that the complexity of the structure of the valve disk further increases and the springs make cleaning of the valve more difficult. Furthermore, the use of springs increases the risk of particle generation. Instead of springs, other elastically working elements, which act between the inner and outer disk portion and exert a force in the direction of the retracted setting, can also therefore be used according to the invention.

Preferably, the use of such elastic elements between the inner and outer disk portion is wholly dispensed with, however. To this end, the invention provides, in particular, that, prior to adjustment of the valve disk from the closed setting into the open setting, a relative underpressure on the first side of the first opening is applied to the valve, so that the inner disk portion is moved from the, where necessary, adopted extended setting, or an intermediate setting, into the retracted setting. Alternatively, on the second side, a relative overpressure is applied. If the creation of such pressure ratios prior to the opening of the valve is not possible, however, the invention alternatively provides that a guide is provided in the valve housing, which guide is arranged in the valve housing such that, when the valve disk is pivoted in the transverse direction from the intermediate setting into the open setting, the inner disk portion is guided into the retracted setting.

In a preferred, advantageous refinement of the invention, the drive is used to return the inner disk portion into the retracted setting. To this end, the at least one drive is configured such that the valve disk is both pivotable or displaceable between the open setting and the intermediate setting by means of the transverse motion, and is displaceable between the intermediate setting, the closed setting and an initialization setting by means of the longitudinal motion. In the initialization setting, the distance of the outer disk portion from the second wall is reduced such that the inner disk portion rests with its second face on the second bearing surface and is pushed—in particular fully—into the retracted setting. The intermediate setting lies between the closed setting and the initialization setting, wherein the initialization setting lies on the second side, i.e. the side of the second opening, and the closed setting lies on the first side, i.e. the side of the first opening.

For the automation of the collision-free closing and opening process, the invention provides that the valve has a control system, which is configured such that and is connected, in particular control-connected, to the drive such that the valve disk, for the gastight interruption of the flow path, is adjustable by means of the transverse motion of the drive from the open setting into the intermediate setting and by means of the longitudinal motion of the drive from the intermediate setting into the closed setting. Moreover, the control system is configured such that and is connected, in particular control-connected, to the drive such that the valve disk, for the complete opening of the flow path, is adjustable by means of the longitudinal motion of the drive from the closed setting into the initialization setting, and subsequently into the intermediate setting, and by means of the transverse motion of the drive from the intermediate setting into the open setting. Prior to the opening of the valve, the inner disk portion can thus be in an optional setting between the retracted setting and the extended setting, since, by the adjustment of the valve disk from the closed setting into the initialization setting, the inner disk portion is pushed—in particular fully—into the retracted setting. A frictional contact or a collision between the inner disk portion and the valve housing, in particular the second bearing surface, and a resulting particle generation, are thus avoided. Depending on the drive which is used, the control system can be constituted by an electronic, electrical, mechanical, pneumatic, hydraulic or other control system, wherein a suitable transmission should also be construed as a control system. In particular, the control system is constituted by an electronic control system, which is in appropriate electrical signal connection with the electric drive.

The valve according to the invention is described in greater detail below, purely by way of example, on the basis of concrete illustrative embodiments represented schematically in the drawings.

BRIEF DESCRIPTION OF THE DRAWINGS

More specifically.

DETAILED DESCRIPTION

FIGS. 1 to 4*d* show a joint, exemplary embodiment of a valve according to the invention in different states, from different views and in different degrees of detailing. These figures are therefore described jointly, wherein reference symbols and features which have already been explained in preceding figures are, in part, not discussed anew.

Figure 1:
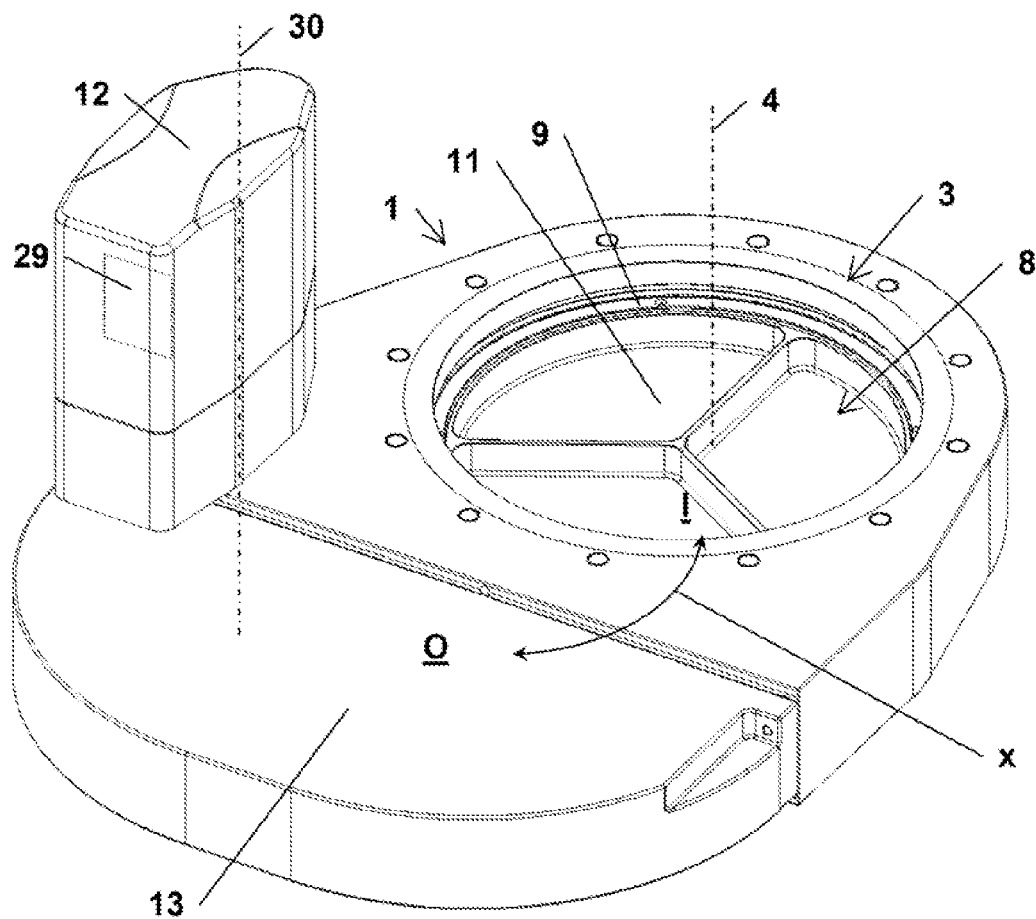
FIG. 1 shows an oblique view of a valve according to the invention in the intermediate setting.
Figure 2:
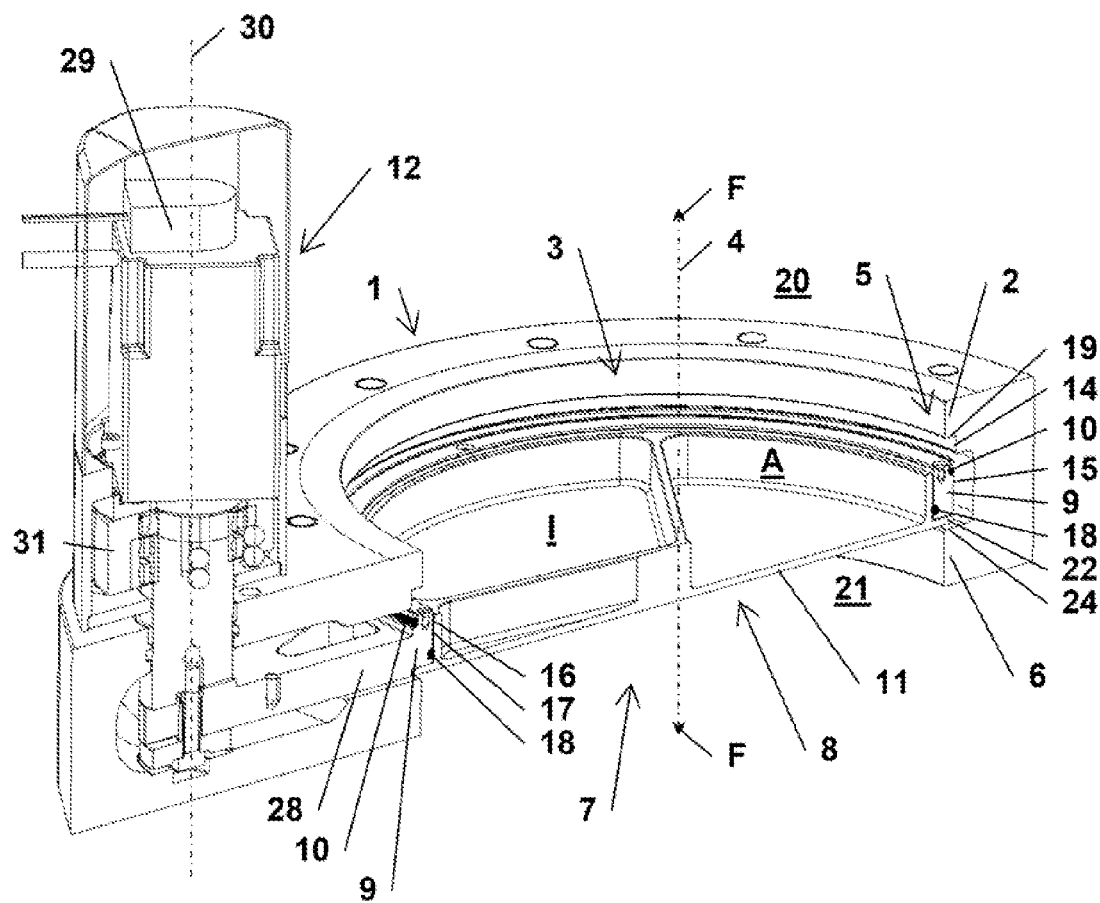
FIG. 2 shows an oblique sectional view of the valve from FIG. 1 in the intermediate setting.

In FIGS. 1 to 4*d*, one possible embodiment of the valve according to the invention, in the form of a shuttle valve, is represented. The valve for the substantially gastight interruption of a flow path F, which in FIG. 2 is symbolized by the use of arrows, possesses a valve housing 1, which has a first opening 3 and an opposite second opening 7. Both openings 3 and 7 have a circular cross section. In the closed setting C of a valve disk 8, FIGS. 3*b*, 3*c*, 4*b* and 4*c*, the two openings 3 and 7 are mutually separated in a gastight manner by means of the valve disk 8, while in the open setting O of the valve disk 8 the two openings 3 and 7 are mutually connected. The open setting O of the valve disk 8 is illustrated in FIG. 1 by the use of the curved arrow.

The valve housing 1 is composed, in particular, of a first wall 2, in which the first opening 3 is shaped out, and a second wall 6, lying parallel to the first wall 2, in which the second opening 7 is shaped out. The first wall 2 is located on a first side 20 of the valve housing 1, and the second wall 6 on a second side 21 of the valve housing 1. The second wall 6 has in remote, substantially parallel opposition to the first wall 2, and to the first opening 3, the second opening 7 for the flow path F, as shown in FIGS. 2 to 4*d*.

Both openings 3 and 7 have a common geometric rectilinear opening axis 4, which runs through the geometric center points of the circular openings 3 and 7, as shown in FIGS. 1 to 3*d*.

The first opening 3 is enclosed by a valve seat 5. This valve seat 5 is formed by a first inner face 14, which points radially inward and runs parallel to the opening axis 4 and has the form of a geometric circular-cylindrical shell surface, and which is shaped out in the valve housing 1, as shown in FIG. 2.

Moreover, the valve possesses a valve disk 8 having an annular outer disk portion 9 and a closed, circular disc shaped inner disk portion 11, as shown in FIGS. 2 to 4*d*.

The outer disk portion 9 has a first outer face 15, which points radially outward and runs parallel to the opening axis 4 and which has the form of a geometric circular-cylindrical shell surface. This first outer face 15 has a form corresponding with the first inner face 14 of the valve seat 5 and is thus arranged and configured such that, in a closed setting C of the outer disk portion 9 of the valve disk 8, a radially sealing contact with the first inner face 14 exists by means of a first seal 10. The first seal 10, in the form of an O-ring of circular cross section, is fixed on the first outer face 15 of the outer disk portion 9, for the creation of the radially sealing contact with the first inner face 14 of the valve seat 5, in a groove running around the outer disk portion 9, as shown in FIGS. 2 to 4*d*.

The inner disk portion 11 is mounted in a sealtight manner such that it is linearly movable within the outer disk portion 9 relative to the outer disk portion 9, in a direction parallel to the opening axis 3, between a retracted setting A and an extended setting B. To this end, the annular outer disk portion 9 has a second inner face 16, which points radially inward and runs parallel to the opening axis 4 and which has the form of a geometric circular-cylindrical shell surface. The second inner face 16 and the first outer face 15 of the outer disk portion 9 run concentrically to each other. The circular disc shaped inner disk portion 11 has a second outer face 17, which points radially outward and runs parallel to the opening axis 4 and corresponds with the second inner face 16 and which likewise has the form of a geometric circular-cylindrical shell surface. Between this second outer face 17 and the second inner face 16, via an intervening second seal 18, a radially sealing contact exists in the region between the retracted setting A and the extended setting B. This second seal 18 is configured as an O-Ring of circular cross section. In the illustrative embodiment shown in FIGS. 1 to 4*d*, the second seal 18 is fixed in an inner groove on the second inner face 16 of the outer disk portion 9 for the creation of the radially sealing contact with the second outer face 17 of the inner disk portion 11.

Figure 3A:
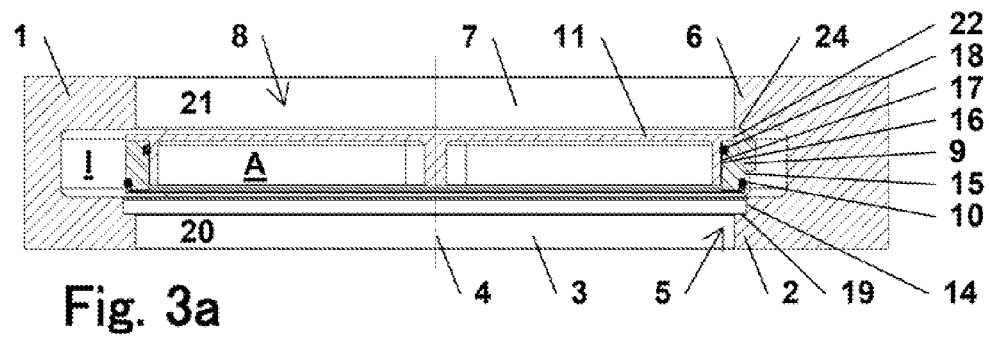
FIG. 3*a* shows a lateral cross sectional view of the valve from FIG. 1 in the intermediate setting, with the inner disk portion in retracted setting.
Figure 3B:
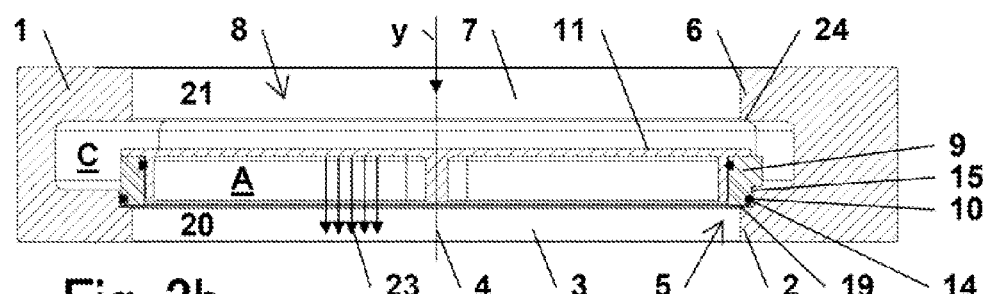
FIG. 3*b* shows a lateral cross sectional view of the valve in the closed setting, with the inner disk portion in retracted setting.
Figure 3C:
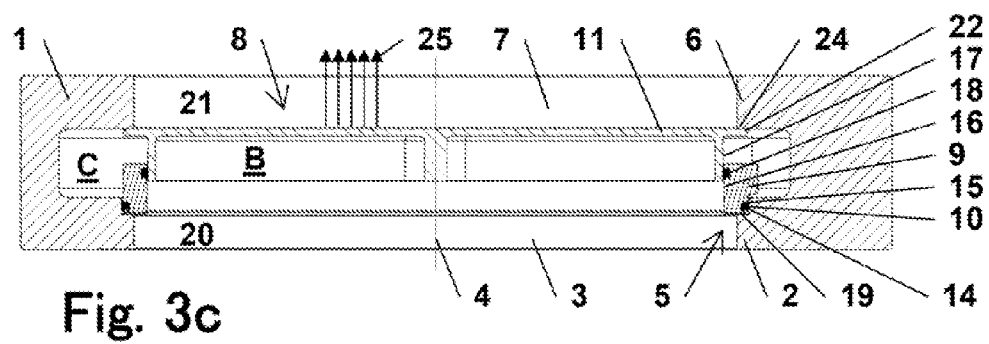
FIG. 3*c* shows a lateral cross sectional view of the valve in the closed setting, with the inner disk portion in extended setting.
Figure 3D:
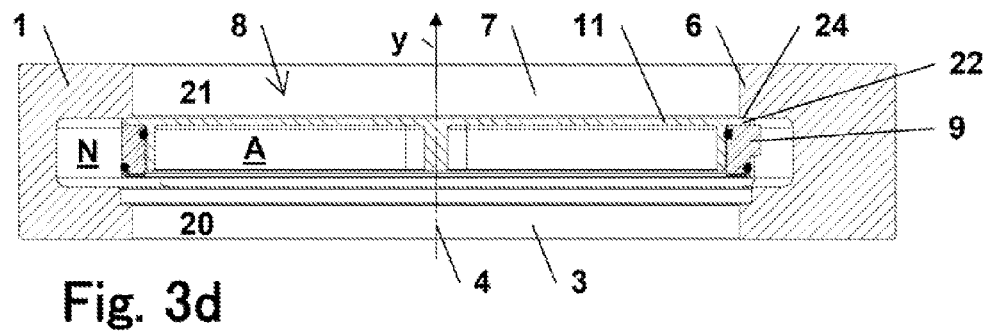
FIG. 3*d* shows a lateral cross sectional view of the valve in the initialization setting, with the inner disk portion in retracted setting.
Figure 4A:
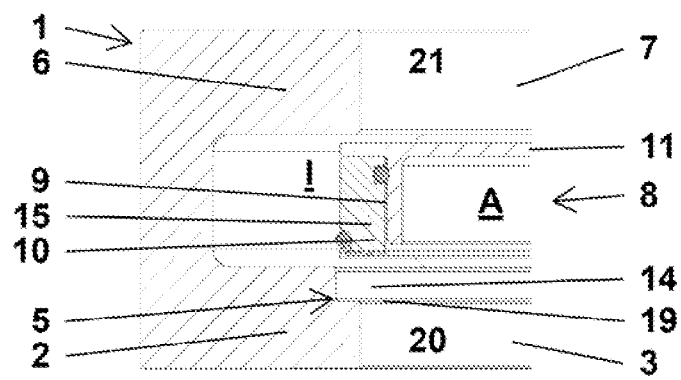
FIG. 4*a* shows a detailed view from FIG. 3*a*.
Figure 4B:
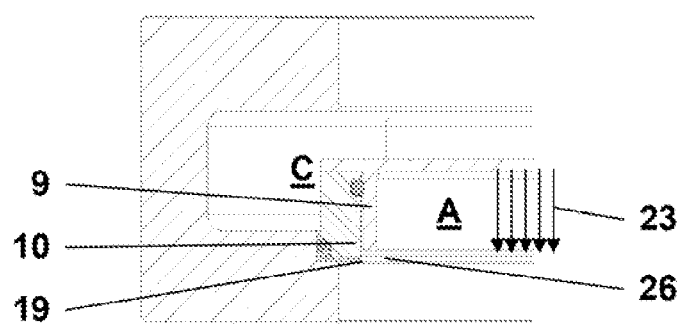
FIG. 4*b* shows a detailed view from figure. 3*b*.
Figure 4C:
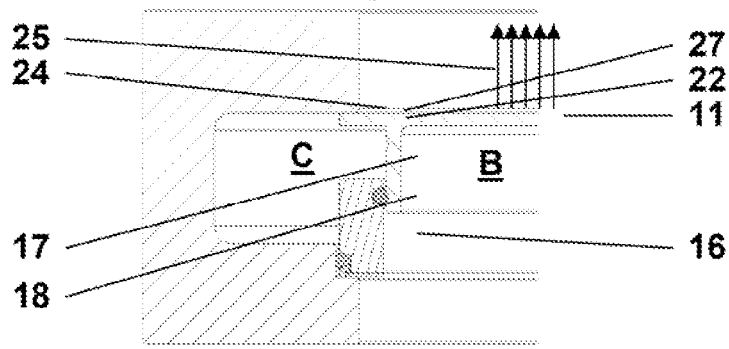
FIG. 4*c* shows a detailed view from FIG. 3*c*.
Figure 4D:
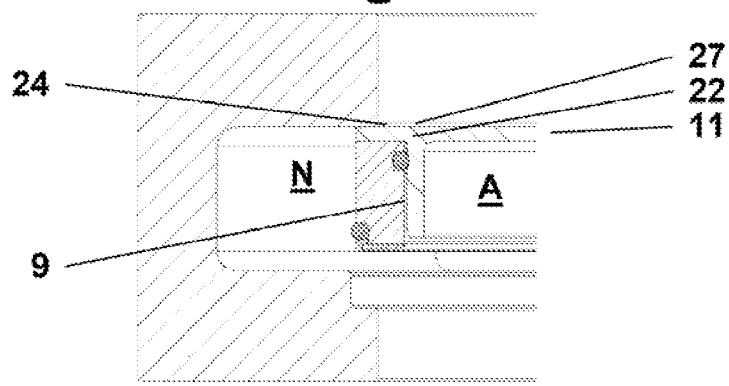
FIG. 4*d* shows a detailed view from FIG. 3*d*.
Figure 5:
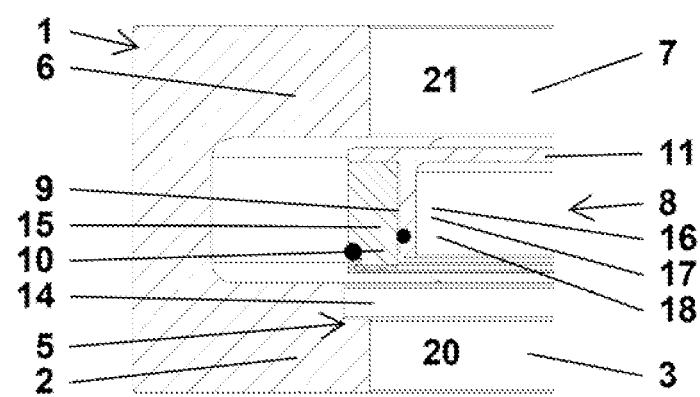
FIG. 5 shows a lateral detailed cross sectional view of an alternative embodiment of the valve in the intermediate setting, with the inner disk portion in retracted setting.

In FIG. 5 is shown, by contrast, an alternative embodiment which differs from the embodiment shown in FIGS. 1 to 4*d* in that the second seal 18 is fixed in an outer groove on the second outer face 17 of the inner disk portion 11 for the creation of the radially sealing contact with the second inner face 16 of the outer disk portion 9.

The outer disk portion 9 is connected to an electric drive 12 by an arm 28 arranged on the side of the outer disk portion 9 and extending perpendicular to the opening axis 4. In the closed setting C of the valve disk 8, this arm 28 is located outside the apertural cross section, projected along the opening axis 4, of the first opening 3, as can be seen in FIGS. 1, 2, 3b and 3c.

Through the use of a corresponding transmission 31, an electric drive 12 is configured such that the valve disk 8—as is customary in a shuttle valve—is pivotable by means of the transverse motion x of the drive 12 transverse to the opening axis 4 and substantially parallelly over the cross section of the first opening 3 and perpendicularly to the opening axis 4 in the form of a pivot motion about the pivot axis 30 between an open setting O and an intermediate setting I, as shown in FIG. 1, and is linearly displaceable by means of a longitudinal motion y, made parallel to the opening axis 4, of the drive 12, as shown in FIGS. 3a to 4d. In the open setting O, the valve disk 8 is positioned in a retention portion 13 disposed beside the first opening 3, so that the first opening 3 and the flow path F are freed, FIG. 1. In the intermediate setting I, FIGS. 1, 2, 3a and 4a, the valve disk 8 is positioned over the first opening 3 and covers the apertural cross section of the first opening 3. In the closed setting C, FIGS. 3b, 3c, 4b and 4c, the first opening 3 is closed in a gastight manner, and the flow path F interrupted, by the existence of a gastight contact between the first outer face 15 of the outer disk portion 9 and the first inner face 14 of the valve seat 5.

Due to the division of the valve disk 8 into an outer disk portion 9, which is coupled to the drive 12 via the arm 28 and can be brought into gastight contact with the valve seat 5, and an inner disk portion 11, which is substantially freely movable relative to the outer disk portion 9 in a direction parallel to the opening axis 4, in the closed setting C a pressure differential at the valve disk 8 acts substantially upon the movable inner disk portion 11. In a direction parallel to the opening axis 4, the inner disk portion 11 is substantially decoupled from the outer disk portion 9 and is supported directly or indirectly on the valve housing 1, as shown below.

On the first wall 1, a first bearing surface 19, enclosing the first opening 3, is shaped out in the valve housing 1.

This first bearing surface 19 is formed by an offset 19 in the first opening 3, which offset adjoins the first inner face 14 and runs substantially perpendicularly or radially to the opening axis 4, as shown in FIGS. 3a to 4d. This offset 19 is arranged in a ring-like manner around the first opening 3 and extends along a geometric plane, to which the opening axis 4 is a geometric normal. This offset 19 thus constitutes the first bearing surface 19, pointing in the direction of the outer disk portion 9, for a first face 26 of the outer disk portion 9. The offset 19 and the first face 26 have mutually corresponding shapes, so that the first face 26 can come to lie on the first bearing surface 19. The first bearing surface 19 and the outer disk portion 9 are thus arranged and configured such that, in the closed setting C, the outer disk portion 9 rests with a first face 26 in the direction of the first side 20 on the first bearing surface 19, as shown in FIGS. 3b, 3c, 4b and 4c. The first bearing surface 19 of the first wall 2 thus forms a travel limitation for the outer disk portion 9 upon the linear adjustment of this outer disk portion 9 along the opening axis 4 of the intermediate setting I, FIGS. 3a and 4a, into the closed setting C, FIGS. 3b and 4b, and thus defines the closed setting C of the outer disk portion 9.

In the initial setting, the inner disk portion 11 is in retracted setting A in the outer disk portion 9, as shown in FIGS. 3a, 3b, 4a and 4b. For the limitation of the relative linear mobility of the inner disk portion 11 in the direction of the first side 20 and of the first opening 3, a stop 22 is disposed between the outer disk portion 9 and the inner disk portion 11. This stop is formed by a shoulder 22 of the inner disk portion 11, which extends radially outward from the second outer face 17 of the inner disk portion 11. In the closed setting C of the outer disk portion 9, when relative underpressure 23 prevails on the first side 20 of the first opening 3, the shoulder 22 causes the inner disk portion 11 to rest in the retracted setting A on the outer disk portion 9, as shown in FIGS. 3b and 4b. The shoulder 22, by virtue of its impact on the outer disk portion 11, thus defines the retracted setting A, as shown in FIGS. 3b and 4b. If, in the closed setting C, in which the outer disk portion 9 rests with its first face 26 on the first bearing surface 19, as shown in FIGS. 3b and 4b, a relative underpressure prevails on the first side 20 of the first opening 3, by which should be understood also a relative overpressure on the second side 21 of the second opening 7, then the inner disk portion 11 is forced in the direction of the first side 20 and of the first opening 3. The inner disk portion 11 rests in the retracted setting A on the outer disk portion 9, in that the shoulder 22 of the inner disk portion 11 is supported on the outer disk portion 9. The inner disk portion 11 is thus supported indirectly, namely via the outer disk portion 9, on the first bearing surface 19 of the first wall 2 of the valve housing 5, as shown in FIGS. 3b and 4b. As a result of this supporting of the entire valve disk 8 on the valve housing 1, the arm 28 of the drive 12, as well as the drive 12 itself, is not subjected to load by the prevailing underpressure 23, since substantially the entire differential pressure acts upon the valve housing 1.

If, in the closed setting C, a reversal of the differential pressure occurs, so that a relative underpressure 25 prevails on the second side 21 of the second opening 7, by which should be understood also a relative overpressure on the first side 20 of the first opening 3, a force acts upon the valve disk 8 in the direction of the second opening 7 and of the second side 21. The movable inner disk portion 11 is thus moved out of its retracted setting A into the extended setting B in the direction of the second side 21. In order to effect a supporting of the inner disk portion 11 on the valve housing 1 in this situation also, on the second wall 6 is shaped out a second bearing surface 24, which fully encloses the second opening 7 and serves as a bearing surface for the inner disk portion 11. This second bearing surface 24 extends perpendicularly or radially to the opening axis 4 and runs along a geometric plane, to which the opening axis 4 forms a normal. The shoulder 22, which extends on the inner disk portion 11 radially outward from the second outer face 17, and the second bearing surface 24 have dimensions which correspond such that and are arranged and configured such that a second face 27, pointing toward the second side 21, of the shoulder 22 of the inner disk portion 11 can come to lie on the second bearing surface 24. This shoulder 21, with its second face 27, and the second bearing surface 24 of the second wall 6 thus serve to limit the relative linear mobility of the inner disk portion 11 in the direction of the second side 21 and of the second opening 7. If the outer disk portion 9 is in the closed setting C and relative underpressure 25 prevails on the second side 21 of the second opening 7, as shown in FIGS. 3c and 4c, then the inner disk portion 11 travels in the extended setting B and rests with the second face 27 in the direction of the second side 21 on the second bearing surface 24. The inner disk portion 11 is thus supported directly on the second bearing surface 24 of the second wall 7 of the valve housing 1, so that, with these pressure ratios also, both the drive 12 and the arm 28 of the drive 28 are substantially rid of forces at the valve disk 8, which, due to the underpressure 25, prevail on the second side 21.

If, in the closed setting C, relative underpressure prevails on the second side 21 of the second opening 7 and the inner disk portion 11 is in the extended setting B, as shown in FIGS. 3c and 4c, the inner disk portion 11, prior to the pivoting of the valve disk 8 from the intermediate setting I, FIG. 3a, into the open setting O, must be brought back into the retracted setting A in order to prevent a frictional contact, which generates friction particles, between the inner disk portion 11 and the second wall 6 during the performance of the transverse motion x, FIG. 1. To this end, the invention provides in this illustrative embodiment that the drive 12, in particular the transmission 31 of the drive 12, is configured such that the valve disk 8 is pivotable between the open setting O, FIG. 1, and the intermediate setting I, FIGS. 3a and 4a, by means of the transverse motion x about the pivot axis 30, and is linearly displaceable between the intermediate setting I, FIGS. 3a and 4a, the closed setting C, FIGS. 3b, 3c, 4b and 4c, and an initialization setting N, FIGS. 3d and 4d, by means of the longitudinal motion y along the opening axis 4. The intermediate setting I lies between the closed setting C and the initialization setting N.

In the initialization setting N, FIGS. 3d and 4d, the distance of the outer disk portion 9 from the second wall 6 is reduced such that the inner disk portion 11 rests with its second face 27 on the second bearing surface 24 and is pushed fully into the retracted setting A, so that in the initialization setting N the shoulder 22 of the inner disk portion 11 rests on the outer disk portion 9, as shown in FIGS. 3d and 4d. Starting from this initialization setting N, FIGS. 3d and 4d, the valve disk 8 can be adjusted by means of the drive 12, with the inner disk portion 11 in retracted setting A, for the complete opening of the valve, linearly into the intermediate setting I, FIGS. 3a and 4a, and can be pivoted from there into the open setting O by means of the pivoting transverse motion x without an ensuing collision between the inner disk Portion 11 and the valve housing 1.

In order to enable automated opening and closing of the valve, the valve provides an electronic control system 29, which is configured such that and is connected to the drive 12 and the transmission 31 such that the valve disk 8 is correspondingly adjustable for the gastight interruption of the flow path F and for the complete opening of the flow path F. For the gastight interruption of the flow path F, the valve disk 8 is adjustable by the control system 29, by means of the transverse motion x of the drive 12, from the open setting O, FIG. 1, into the intermediate setting I, FIGS. 3a and 4a, and, by means of the longitudinal motion y of the drive 12, from the intermediate setting I, FIGS. 3a and 4a, into the closed setting C, FIGS. 3b and 4b. For the complete opening of the flow path F, the valve disk 8 is adjustable by the control system 29, by means of the longitudinal motion y of the drive 12, from the closed setting C, in which the inner disk portion 11 is in an optional setting between the retracted setting A, FIGS. 3b and 4b, and the extended setting B, FIGS. 3c and 4c, via the initialization setting N for the complete pushing of the inner disk portion 11 into the retracted setting B, FIGS. 3d and 4d, in the intermediate setting I, FIGS. 3a and 4a, and from there, by means of the transverse motion x of the drive 12, from the intermediate setting I, FIGS. 3a and 4a, into the open setting O, FIG. 1.

Alternatively, the possibility exists that, upon the closure of the valve, the initialization setting I is adopted. Particularly in the case of a non-electronic control system, this can be advantageous for the simplification of the structure of the control system. In this case, the motional sequence of the valve disk 8 in the closing operation corresponds to that in the opening operation.

In the present illustrative embodiment, the drive 12 is configured as an electric motor, wherein the transmission 31 is switchable such that a driving of the drive 12 produces either the transverse motion x or the longitudinal motion y. The drive 12 and the transmission 31 are controlled electronically by the control system 29. It is thus possible, by an input signal fed to the control system, which input signal predefines the direction of adjustment, i.e. opening or closing, to have the motional sequence of the valve disk 8 executed automatically. Alternatively, the possibility exists that the control system 29 is formed by the transmission 31, wherein—particularly depending on the direction of adjustment of the drive 12—the individual settings are adopted. Such transmissions, in particular with gate shifts, are known from the prior art. It is further possible to use a plurality of drives to produce the transverse motion x and the longitudinal motion y, wherein the control system 29 takes charge of the controlling of the drives.

The described shuttle valve is suitable, in particular, for use as a regulating valve, wherein the precise regulation of the flow rate is possible not only by pivoting adjustment of the valve disk 8 between the open setting O and the intermediate setting I by means of the transverse motion x, but, above all, by linear adjustment of the valve disk 8 along the opening axis 4 between the intermediate setting I, the closed setting C and the initialization setting N by means of the longitudinal motion y. The described shuttle valve can thus be used also for precise regulating functions. In the case of a molecular instead of a laminar flow, the forces which act upon the valve disk 8 in the regulating operation are sufficiently low that the inner disk portion 11 is secured by the second seal 18 and does not shift. Due to the damping of the valve disk 8, in particular by the elastic seals 10 and 18, a vibration or fluttering of the inner disk portion 11 can be avoided.

What is claimed is:

1. Valve for the substantially gastight interruption of a flow path, comprising:
    a valve housing having a first wall, which wall has a first opening for the flow path, said opening having a geometric opening axis and a valve seat, enclosing the first opening, on a first side of the valve housing,
    a valve disk having
        an, in particular, ring-like or frame-like outer disk portion, and
        a closed inner disk portion, which is mounted in a seal tight manner such that it is linearly movable within the outer disk portion in a direction parallel to the opening axis relative to the outer disk portion between a retracted setting and an extended setting,
    at least one drive, which is connected to the outer disk portion and which is configured such that the valve disk is pivotable or displaceable between
        an open setting, in which the valve disk is positioned in a retention portion disposed beside the first opening and frees the first opening and the flow path, and
        an intermediate setting, in which the valve disk is positioned over the first opening and covers the apertural cross section of the first opening,
    by means of a transverse motion made substantially transverse to the opening axis, and is displaceable between
        the intermediate setting and
        a closed setting, in which a gastight contact, which closes the first opening in a gastight manner and interrupts the flow path, exists between the outer disk portion and the valve seat,
    by means of a longitudinal motion made parallel to the opening axis, wherein, in the closed setting, a pressure differential at the valve disk acts substantially upon the movable inner disk portion and the inner disk portion is supported in a direction parallel to the opening axis, substantially decoupled from the outer disk portion, directly or indirectly on the valve housing,
wherein
   the valve seat has a first inner face, which points radially inward and runs parallel to the opening axis,
   the outer disk portion has a first outer face, which points radially outward and runs parallel to the opening axis and which is arranged and configured such that in the closed setting, via an intervening first seal, there exists a radially sealing, contact with the first inner face,
   the outer disk portion has a second inner face, which points radially inward and runs parallel to the opening axis, and
   the inner disk portion has a second outer face, which points radially outward and runs parallel to the opening axis and which is arranged and configured such that, via an intervening second seal, a radially sealing contact with the second inner face exists in the region between the retracted setting and the extended setting.

2. Valve according to claim 1,
wherein
   the first wall has a first bearing surface, which encloses, in particular, the first opening, and
   the first bearing surface and the outer disk portion are arranged and configured such that, in the closed setting, the outer disk portion rests with a first face in the direction of the first side on the first bearing surface.

3. Valve according to claim 2,
wherein
the first bearing surface is configured as an offset in the first opening, which offset adjoins the first inner face and runs substantially perpendicular to the opening axis.

4. Valve according to claim 1,
wherein
a stop is arranged between the outer disk portion and the inner disk portion in order to limit the relative linear mobility of the inner disk portion in the direction of the first side and of the first opening, such that in the closed setting the inner disk portion, when relative underpressure prevails on the first side of the first opening, rests in the retracted setting on the outer disk portion.

5. Valve according to claim 4,
wherein
the stop is configured as a shoulder of the inner disk portion, which shoulder extends radially outward from the second outer face.

6. Valve according to claim 1,
wherein
   the valve housing has on a second side a second wall, which, in remote, substantially parallel, opposition to the first wall and to the first opening, has a second opening for the flow path,
   the second wall has a second bearing surface, which encloses, in particular, the second opening, and
   the second bearing surface and the inner disk portion, in order to limit the relative linear mobility of the inner disk portion in the direction of the second side and of the second opening, are arranged and configured such that in the closed setting the inner disk portion, when relative underpressure prevails on the second side of the second opening, rests in the extended setting with a second face in the direction of the second side on the second bearing surface.

7. Valve according to claim 6,
wherein
the second face of the inner disk portion is disposed on a shoulder extending radially outward from the second outer face.

8. Valve according to claim 6,
wherein
the at least one drive is configured such that the valve disk
   is pivotable or displaceable between
     the open setting, and
     the intermediate setting
   by means of the transverse motion, and is displaceable between
     the intermediate setting,
     the closed setting and
     an initialization setting, in which the distance of the outer disk portion from the second wall is reduced such that the inner disk portion rests with its second face on the second bearing surface and is pushed fully into the retracted setting,
by means of the longitudinal motion, wherein the intermediate setting lies between the closed setting and the initialization setting.

9. Valve according to claim 8,
comprising:
a control system, which is configured such that and is connected to the drive such that the valve disk, for the gastight interruption of the flow path, is adjustable
   by means of the transverse motion of the drive
     from the open setting
     into the intermediate setting and
   by means of the longitudinal motion of the drive
     from the intermediate setting
     into the closed setting
and, for the complete opening of the flow path, is adjustable
   by means of the longitudinal motion of the drive
     from the closed setting, in which the inner disk portion is in an optional setting between the retracted setting and the extended setting,
     via the initialization setting for pushing the inner disk portion fully into the retracted setting
     in the intermediate setting and
   by means of the transverse motion of the drive
     from the intermediate setting
     into the open setting.

10. Valve according to claim 1,
wherein
the first seal is fixed on the first outer face of the outer disk portion for the creation of the radial sealing contact with the first inner face of the valve seat.

11. Valve according to claim 1,
wherein
the second seal is fixed
   on the second inner face of the outer disk portion for the creation of the radially sealing contact with the second outer face of the inner disk portion, or
   on the second outer face of the inner disk portion for the creation of the radially sealing contact with the second inner face of the outer disk portion.

12. Valve according to claim 1,
wherein
the outer disk portion is connected to the at least one drive by an arm arranged in such a way on the side of the outer disk portion and extending in such a way perpendicular to the opening axis that the arm, in the closed setting, is located outside the apertural cross section, geometrically projected along the opening axis, of the first opening.

13. Valve according to claim 1,
wherein
the outer disk portion is of annular configuration,
the inner disk portion has the form of a closed circular disk and
the first inner face, the first outer face, the second inner face and the second outer face are geometric circular-cylindrical shell surfaces.

14. Valve according to claim 1,
wherein
the valve is configured as a shuttle valve and
the drive is configured such that the valve disk is pivotable by means of the transverse motion substantially parallelly over the cross section of the first opening and perpendicularly to the opening axis.

* * * * *